J. D. LEACH.
Bilge-Water Gages.
No. 152,657. Patented June 30, 1874.
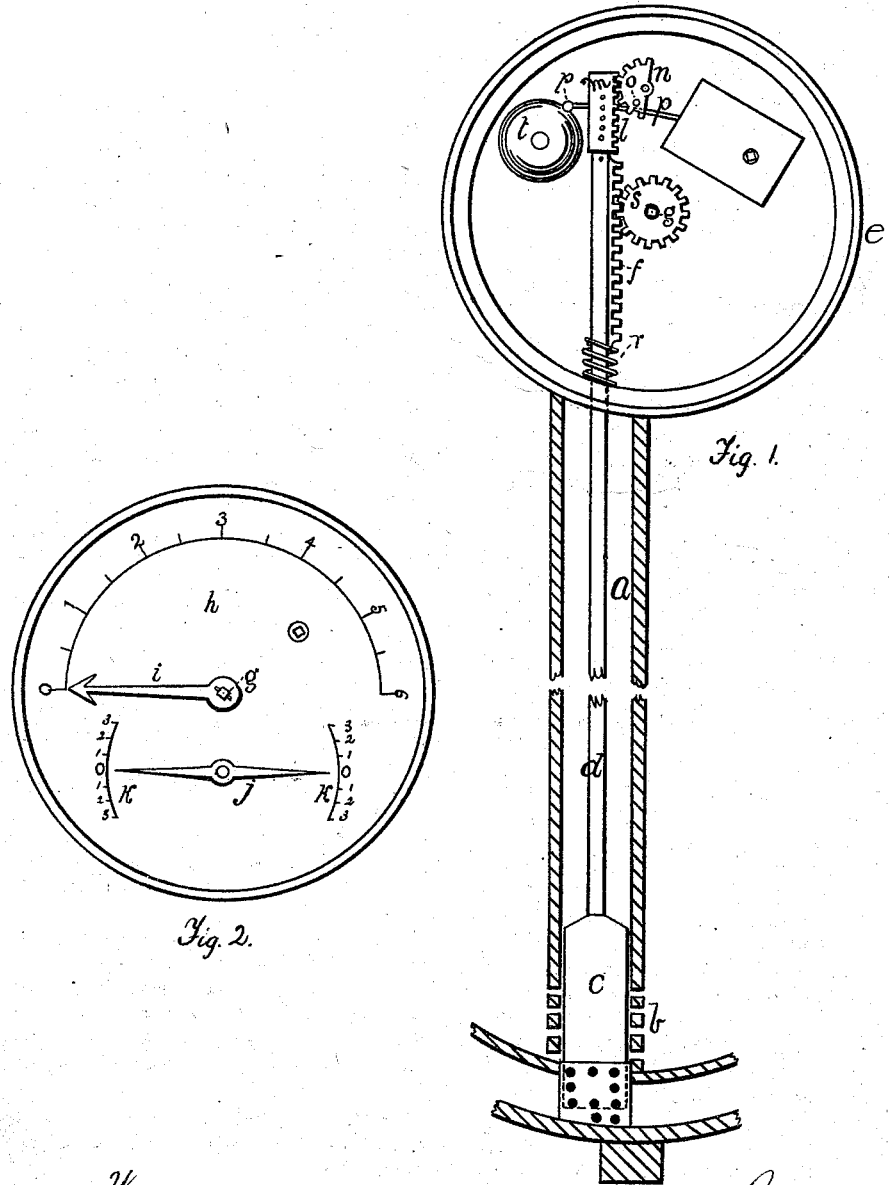

UNITED STATES PATENT OFFICE.

JOSEPH D. LEACH, OF PENOBSCOT, MAINE.

IMPROVEMENT IN BILGE-WATER GAGES.

Specification forming part of Letters Patent No. 152,657, dated June 30, 1874; application filed October 13, 1873.

*To all whom it may concern:*

Be it known that I, JOSEPH D. LEACH, of Penobscot, in the county of Hancock and State of Maine, have invented certain new and useful Improvements in Water-Gages for Vessels; and I do hereby declare that the following is a full, clear, and exact description thereof, that will enable others skilled in the art to which it appertains to make and use the same, reference being had to the accompanying drawings and to the letters of reference marked thereon, which form a part of this specification, in which—

Figure 1 shows a section of the tube and the indicator with the dial removed, showing the devices operating the pointer and alarm. Fig. 2 shows the dial with the pointers showing the depth of water and the list of the vessel.

Same letters show like parts.

The object of my invention is to provide an improved device for indicating the depth of water in the hold of vessels, by which a leak may be readily detected and its extent shown.

My gage acts upon the well-known principle that the upward pressure of water upon a floating body is in proportion to the depth to which the body is submerged, and it operates by weighing this pressure and indicating the result upon a dial arranged to record the depth in feet and inches.

Referring to the drawings, $a$ shows a tube extending to the bottom of the vessel at or near the keel, its lower end being provided with a strainer, $b$, to prevent clogging. Within this tube is a float, $c$, attached to a rod, $d$, passing upward through the decks to the cabin or other convenient locality, and into a casing, $e$. Upon this rod, at $r$, is a spring, attached also to the dial-casing, so that the upward motion of the rod is restrained within certain limits, so that it and the attached float do not actually rise with the water as it enters the bottom of the tube $a$, but the float is gradually covered by the water. As it becomes submerged the upward pressure of the water upon it becomes greater and acts through the rod $d$ upon the spring $r$, which, as it were, weighs it. Near the upper end of this rod $d$ is a rack, $f$, meshing into a pinion, $s$, upon a shaft, $g$, which passes out through the dial $h$ of the casing, and carries a pointer, $i$, which, as the water rises and forces up the float, is moved around the face, indicating the depth upon the figures on the dial, which are arranged in such manner as to give the upward pressure upon the float in feet and inches. In addition to this pointer for indicating the depth of water over the keel of the vessel, the dial may also be provided with a second pointer, $j$, adjusted so as to balance, and provided with a scale, $k$, by which the list of the vessel is shown. This enables the mean depth to be ascertained, which cannot be done by the pointer $i$ alone where the vessel lists to any extent. Another convenient device may be advantageously employed in connection with my gage by securing to the top of the rod $d$ before named a second rack, $l$, by which an alarm may be operated. This rack may be placed upon a sleeve, $m$, adjustable upon the rod, so as to cause the alarm to strike at any desired depth. This rack meshes into a segmental gear, $n$, having a pin, $o$, therein, which, when the gear is in the position shown in the drawing, rests upon the striker $p$, and keeps it from sounding the bell $t$; but as the water rises the gear is turned by the rack on the rod, raising the pin from the striker, which is thus permitted to sound the alarm.

The striker is operated by any of the ordinary devices for operating the striking apparatus of clocks which may be adapted to the purpose.

What I claim as my invention, and desire to secure by Letters Patent, is—

In a water-gage for vessels, the combination of the tube $a$, float $c$, rod $d$, rack $f$, pinion $s$, shaft $g$, pointer $i$, and dial $h$ with a weighing-spring, $r$, regulating the rise of said rod $d$, as set forth.

In testimony that I claim the foregoing I have hereunto set my hand this 8th day of October, 1873.

JOSEPH D. LEACH.

Witnesses:
JOHN D. GRAY,
JOSIAH VARNNUM.